United States Patent [19]

Pasin

[11] Patent Number: 6,004,182

[45] Date of Patent: Dec. 21, 1999

[54] TEMPORARY STRUCTURE

[75] Inventor: Antonio J. Pasin, Chicago, Ill.

[73] Assignee: Radio Flyer, Inc., Chicago, Ill.

[21] Appl. No.: 08/695,872

[22] Filed: Aug. 12, 1996

[51] Int. Cl.⁶ .......................... A63H 33/08; A63H 33/00; E04H 15/64; G09B 23/02

[52] U.S. Cl. .......................... 446/105; 446/115; 446/126; 446/490; 135/119; 434/211

[58] Field of Search .................. 446/105, 107, 446/108, 111, 112, 115, 116, 126, 487, 488, 489, 490; 135/119, 159; 52/DIG. 10; 434/211

[56] References Cited

U.S. PATENT DOCUMENTS

| | | |
|---|---|---|
| 1,843,115 | 2/1932 | Ferris ...................................... 446/126 |
| 3,148,539 | 9/1964 | Cook ...................................... 52/10 X |
| 3,222,841 | 12/1965 | Lipof . |
| 3,459,949 | 8/1969 | Young .................................... 446/124 |
| 3,661,689 | 5/1972 | Spanier ............................... 446/108 X |
| 3,766,932 | 10/1973 | Sidis et al. .................... 52/DIG. 10 X |
| 3,789,904 | 2/1974 | Takazawa . |
| 3,875,623 | 4/1975 | Johnston . |
| 4,033,397 | 7/1977 | McKee . |
| 4,071,990 | 2/1978 | Traber . |
| 4,129,975 | 12/1978 | Gabriel ................................ 446/126 X |
| 4,301,900 | 11/1981 | Rayner ................................ 446/126 X |
| 4,334,868 | 6/1982 | Levinrad ............................. 446/112 X |
| 4,817,655 | 4/1989 | Brooks ................................ 135/119 X |
| 5,002,111 | 3/1991 | Boiteau . |
| 5,061,219 | 10/1991 | Glickman ................................ 446/426 |
| 5,070,665 | 12/1991 | Marrin et al. ....................... 446/108 X |
| 5,352,149 | 10/1994 | Melashenko et al. ............. 446/490 X |

FOREIGN PATENT DOCUMENTS 2077879 12/1981 United Kingdom .................. 446/112

*Primary Examiner*—D Neal Muir
*Attorney, Agent, or Firm*—Rudnick & Wolfe; James P. Ryther; R. Blake Johnston

[57] ABSTRACT

The structures of this invention comprise a plurality of panels. Rod formations are associated with the panels along at least some edges thereof. Joining devices consisting of elongated frame members are provided with openings for removably receiving the rod formations with the associated panel edges. Connectors are utilized for receiving the respective ends of the frame members. By providing a plurality of openings in the connectors for receiving different rod ends, and by providing a plurality of such connectors, numerous temporary structural configurations can be achieved.

15 Claims, 3 Drawing Sheets

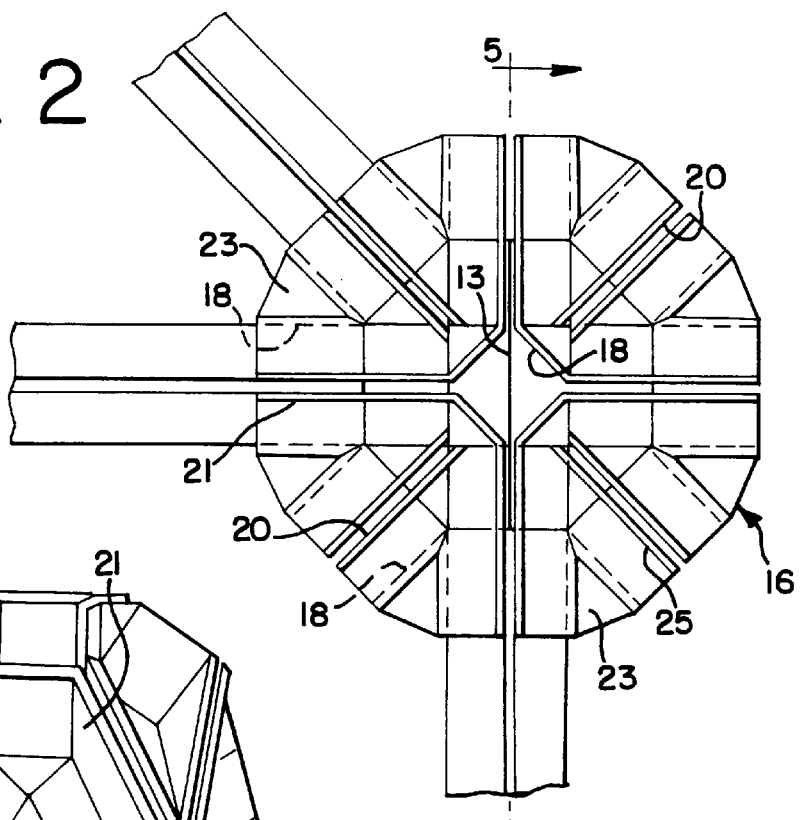
FIG. 2
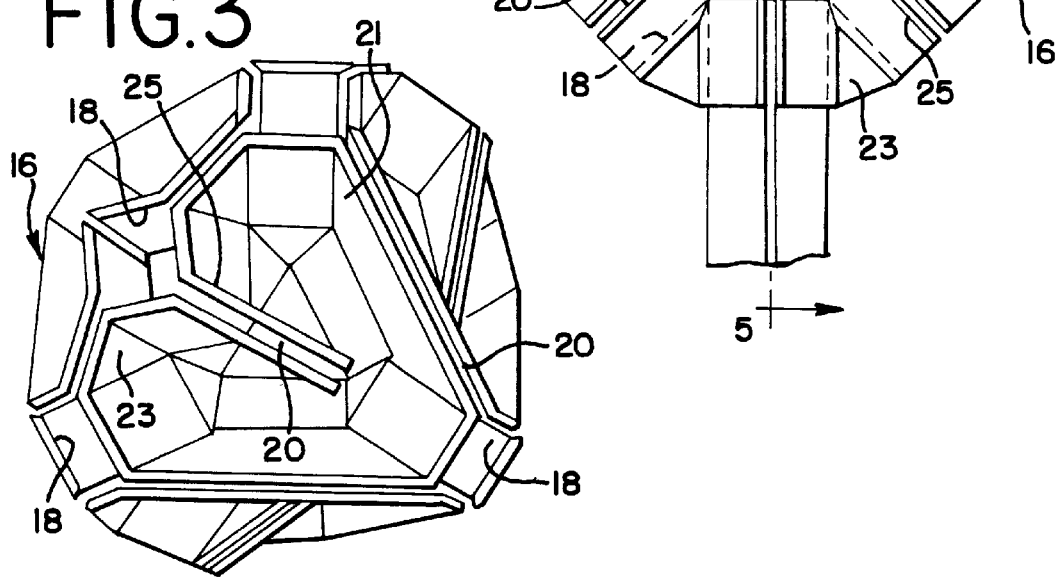
FIG. 3
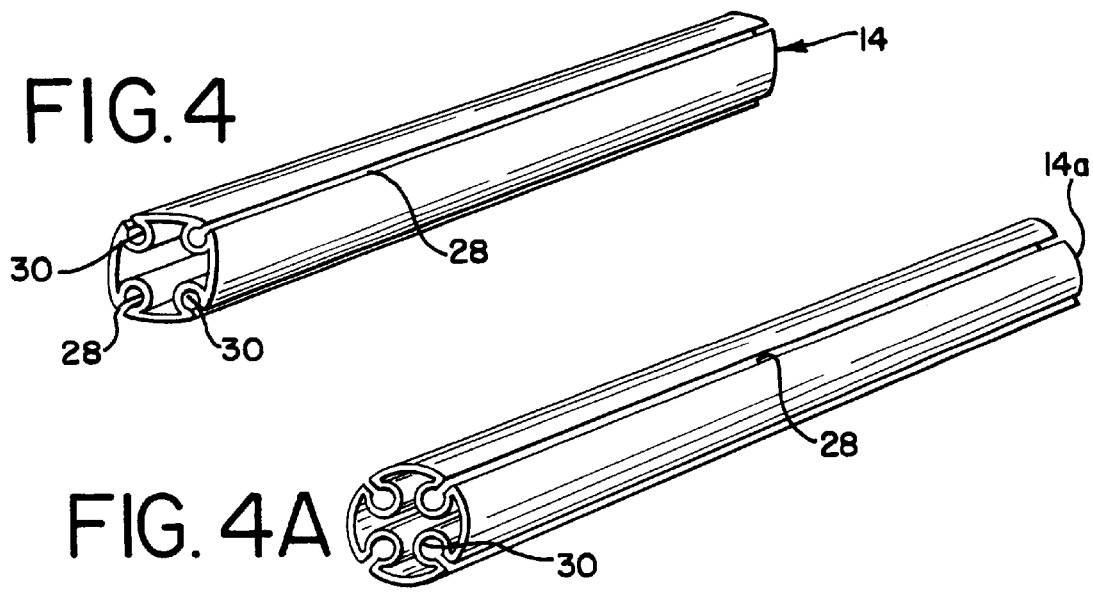
FIG. 4
FIG. 4A

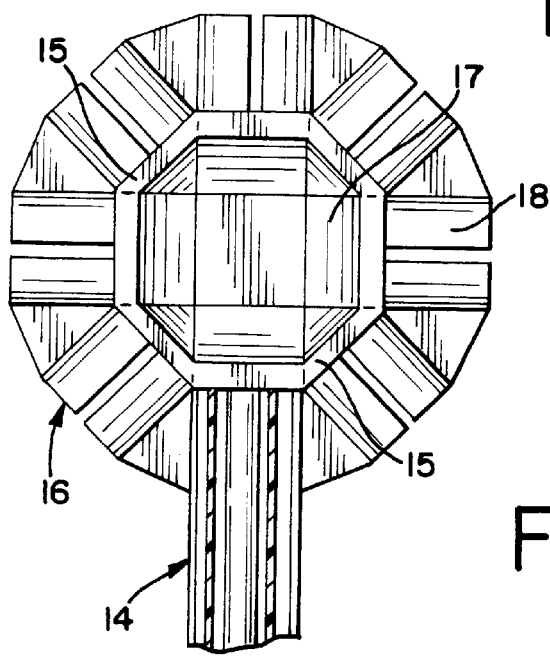
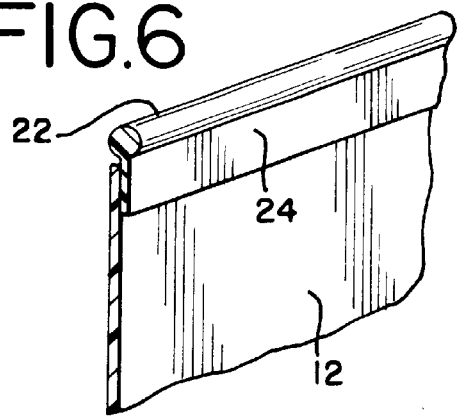
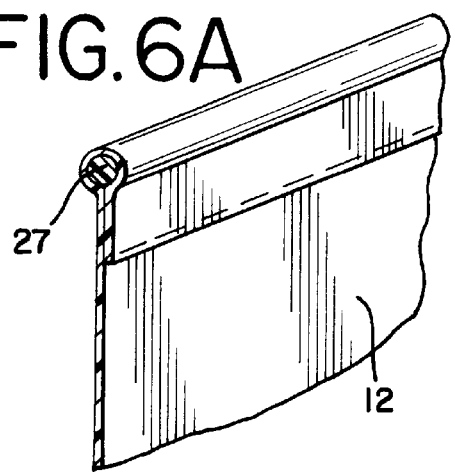
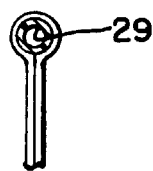
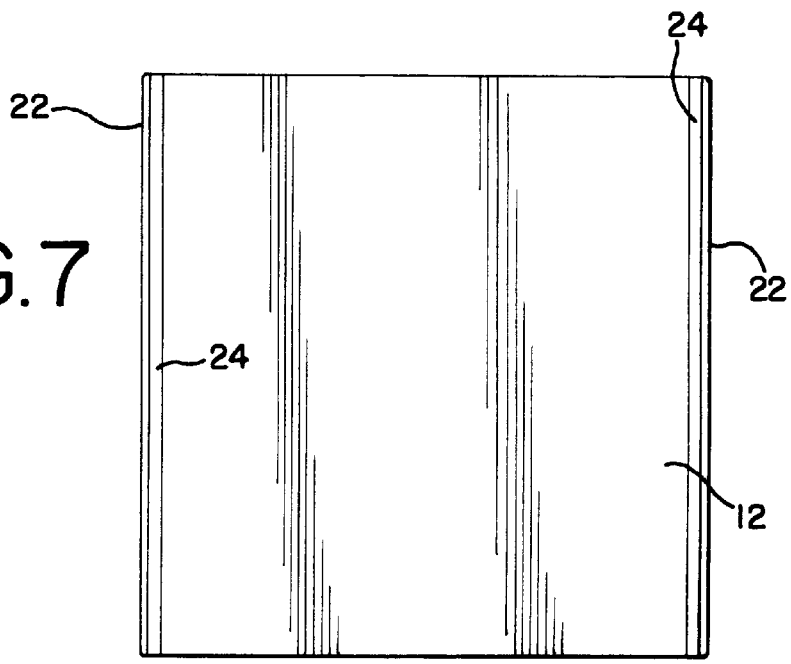

TEMPORARY STRUCTURE

BACKGROUND OF THE INVENTION

This invention relates to a temporary structure, that is, a structure which can be assembled and dismantled at will. Although many applications are possible, a contemplated use of the invention is for the amusement of children.

For many years, popular children's toys have included Erector sets, Tinker Toys, Lincoln Logs, and variations thereof which permitted children to assemble structures of various kinds. It is also well known that children enjoy larger scale structures that they can enter and play in, including tent-like and house-like structures.

Particularly in connection with such larger scale structures, it is highly desirable to achieve parts which are fairly easy to assemble but which, at the same time, represent something of a challenge to the skill and imagination of children.

SUMMARY OF THE INVENTION

This invention involves temporary structures which can be assembled and dismantled with relative ease. The structures of the invention may have numerous applications but are particularly adapted for use by children for amusement purposes.

The structures of this invention comprise a plurality of panels which may be formed of plastic, canvas, or from a variety of fabrics. Rod formations are associated with the panels along at least some edges thereof. Joining devices consisting of elongated frame members are provided with openings for removably receiving the rod formations along with the associated panel edges. Connectors are utilized for receiving the respective frame ends. By providing a plurality of openings in the connectors for receiving different frame ends, and by providing a plurality of such connectors, numerous temporary structural configurations can be achieved.

Where the invention is utilized for the amusement of children, structures such as simulated forts, houses, tents, tunnels, caves, etc. can be readily achieved. In this regard, the shapes of the fabric panels may vary considerably to achieve different configurations. The invention could be employed using plans for achieving a particular design, and it may also be used in a fashion where the final configuration is left solely to the skill and imagination of the child using the invention.

The invention may be manufactured in miniature so that toy figures, cars, etc. may be moved in and out by a child. On the other hand, it is contemplated that a significant application would involve parts large enough so that the children will enter the structure. Even larger scale application is possible for use by adults for more practical purposes.

DESCRIPTION OF THE DRAWINGS

FIG. 2 is an enlarged fragmentary detail view of a connector and associated joining frame member used in the practice of the invention;

FIG. 3 is a perspective view of a connector;

FIG. 4 is a perspective view of a joining frame member;

FIG. 4A is a perspective view of an alternative form of a joining frame member;

FIG. 5 is a cross-sectional view taken about the line 5—5 of FIG. 2;

FIG. 6 is a fragmentary detail view of a fabric panel and associated rod formation used in the practice of the invention;

FIG. 6A is a fragmentary detail view of an alternative form of rod formation;

FIG. 6B is a fragmentary cross-sectional view illustrating a still further form of rod formation; and, FIG. 7 is a plan view of one form of panel used in the practice of the invention.

DESCRIPTION OF THE PREFERRED EMBODIMENTS

Figure 1:
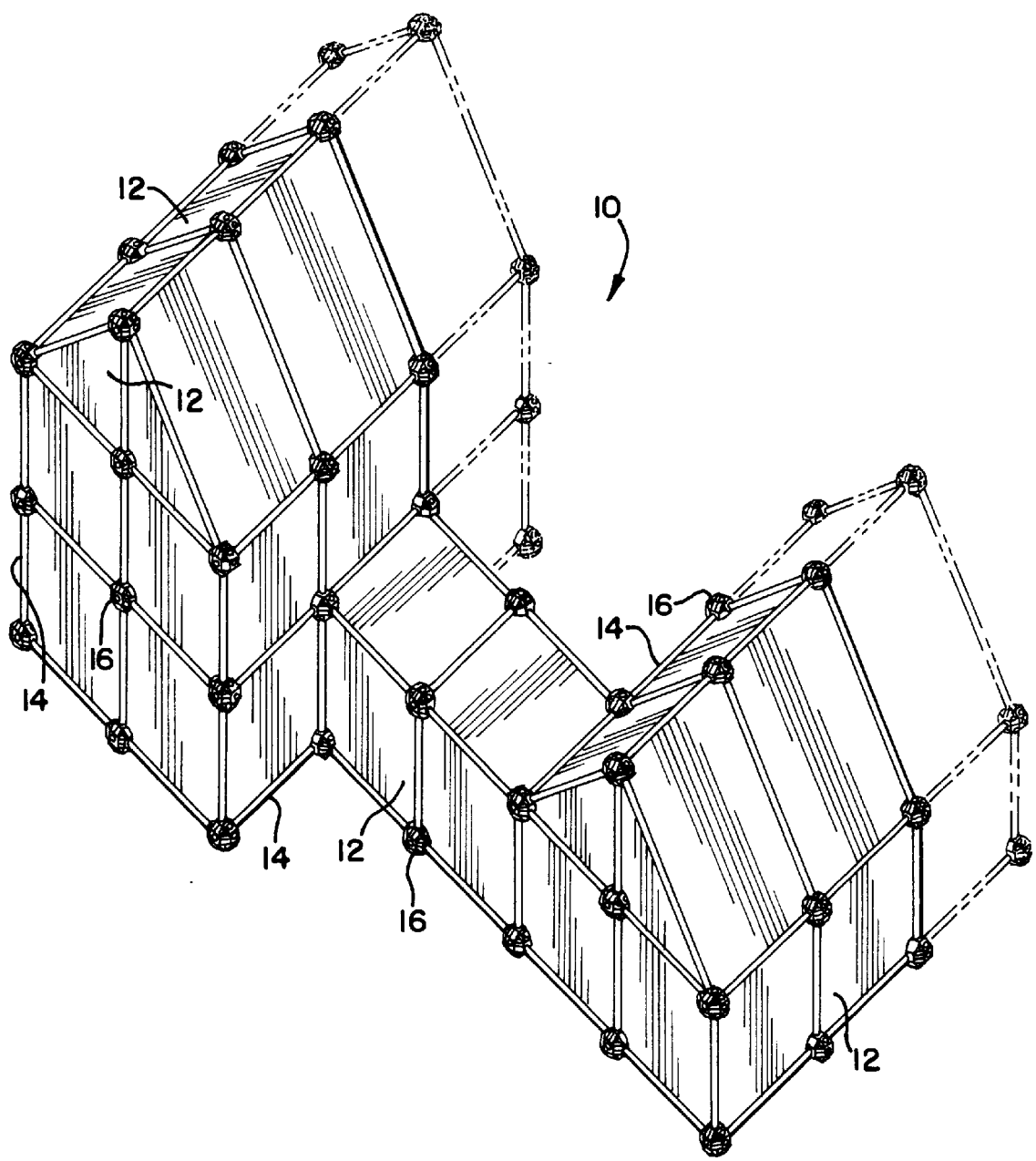
FIG. 1 is a perspective view of a temporary structure assembled in accordance with the invention.

FIG. 1 illustrates a temporary structure 10 embodying the features of the invention. This structure is composed of a plurality of panels 12 which are interconnected by means of joining frame members 14 and connectors 16.

The structure shown in FIG. 1 may be considered a simulated house and garage with interconnecting passageway. As suggested by the phantom lines, the size of the structure is totally variable. Similarly, entry can be had by simply leaving an entire side open, or by excluding one or more of the panels 12. The size of the panels may vary from a few inches to a few feet depending on the ultimate use contemplated.

FIGS. 2–5 illustrate the connectors 16 and joining frame members 14 in greater detail. The latter comprise essentially members of rectangular cross-section having lengths which will vary depending on the length of the side edges of panels 12. These frame members are shown in a straight form but could readily be curved to add still further variations to the structures to be formed.

The connectors 16 consist of blocks defining a plurality of openings 18. These openings are dimensioned to snugly receive the ends of frame members 14 as shown in FIG. 2. Receipt of these ends in a snug fashion is facilitated by the provision of slots 20 which are defined between ribs 21, 23 and 25 which extend the depth of the respective openings 18. The ends of the frame members are preferably dimensioned to at least slightly exceed the dimensions of openings 18 so that a force fit is required. The slots 20 insure that these ends can be inserted.

The frame members 14 are preferably formed of plastic. For example, medium density polyethylene with a UV stabilizer and similar materials readily lend themselves to extrusion operations permitting economical production of the frame members.

Such materials would also be suitable for molding the connectors 16. In this regard, the connectors may comprise two identical molded parts secured face-to-face to achieve the final form. FIG. 5 illustrates one face of such a part including planar face areas 15 surrounding hollow interior 17, and any suitable adhesive may be used to join these face areas with the corresponding face areas of the other molded connector part. The face areas join along line 13 as shown in FIG. 2.

FIGS. 6 and 7 illustrate details of a panel 12. The body of this panel may comprise a thin vinyl sheet, a canvas material, any of various fabrics, or any of several comparable synthetic or natural materials. FIG. 1 illustrates the panels in square, rectangular and triangular form, but it will be apparent that other shapes can easily be accommodated.

A tubular rod formation 22 is formed integrally with a skirt 24, and the skirt 24 is thermoplastically secured to the panel 12. For example, if the panel is formed of a polyvinyl sheet and the rod formation and skirt are formed of an extruded polyvinyl material, pressing of these parts together while applying heat will result in a secure bond.

In the alternative embodiments shown in FIGS. 6A and 6B, the panel 12 includes side edges which are sewn or otherwise formed to provide hems which serve as pockets for stiffening and supporting rods. In FIG. 6A, a rod 27 of solid cross-section is shown while in FIG. 6B, the rod 29 comprises a hollow tube.

As best shown in FIG. 4, each of the joining frame members 14 includes a plurality of slots 28 on its outer surface. Each slot extends inwardly to an enlarged receptacle area 30. The receptacle areas 30 are dimensioned for receiving the rod formations 22 or a rod 27 or 29 with the associated fabric material. Thus, the rod formations or rods are adapted to be forced through the slots 28 and then seated within the receptacle areas 30. The use of extruded plastic for forming the frame members is particularly suitable for achieving this function in view of the resilient character thereof, and where a tubular rod or rod formation is utilized, additional resilience is available to achieve secure assembly. Alternatively, the rod and associated fabric may be inserted from one end of a frame member and slid into position.

FIG. 4 illustrates frame member 14 as having a generally rectangular cross-section. FIG. 4A illustrates a frame member 14a of generally circular cross-section, and it will be appreciated that other variations are possible.

The rods associated with the panels 12 will normally vary in length depending on the length of the frame members with which the panels are associated. It is contemplated, however, that shorter panels will be used if, for example, one desires to simulate a window in a structure side wall.

Where the frame members and panels are essentially coextensive, the slots 20 of connectors 16 receive the panel corners. This provides an especially neat appearance for any structure produced.

It will be understood that various modifications may be made in the structures of the invention without departing from the spirit thereof particularly as described in the following claims.

That which is claimed is:

1. A temporary structure consisting of a plurality of panels defining side edges, rod formations attached along at least some of said side edges of said panels, joining devices having opposite ends and including elongated slots extending intermediate said ends, said slots receiving said rod formations, and connectors defining openings for receiving said ends of said joining devices, said connectors being positioned at intersections for said joining devices, at least some of said connectors having a plurality of said openings extending at different angles whereby the panels can be selectively located to form structures of different shapes.

2. A structure according to claim 1 wherein said rod formations comprise either tubular or solid members.

3. A structure according to claim 1 wherein said joining devices comprise elongated extruded plastic frame members which are either circular or noncircular in cross section, and wherein said openings defined by said connectors have a cross section corresponding in shape to and slightly smaller than the cross section of the frame members for achieving a snug fitting relationship when said ends are received in said openings.

4. A structure in accordance with claim 1 wherein said slots defined by said joining devices extend substantially completely along the length of said devices, and wherein said rod formations extend substantially completely along the lengths of the edges of said panels.

5. A structure in accordance with claim 1 wherein said rod formations extend along each of the edges of said panels.

6. A structure according to claim 1 wherein said joining devices comprise a receptacle for said rod formations defined adjacent each slot and inwardly thereof, said joining devices being formed of a resilient material, and wherein said rod formations are adapted to be pushed through said slots for receipt within an adjacent receptacle.

7. A structure according to claim 6 wherein said joining devices comprise extruded plastic tubes.

8. A structure in accordance with claim 1 wherein said panels are of both rectangular and nonrectangular shape.

9. A structure according to claim 1 wherein said connectors comprise molded plastic blocks.

10. A structure according to claim 1 wherein said rod formations are formed of plastic.

11. A structure according to claim 1 wherein said panels are formed from natural or synthetic materials, or from combinations thereof.

12. A structure according to claim 3 wherein the side walls of the openings defined by said connectors define slots whereby the openings are adapted to expand upon entry of the end of a joining device.

13. A structure according to claim 12 wherein said slots receive the corners of panels supports on frame members having the ends thereof received in connector openings.

14. A structure according to claim 12 wherein said connectors comprise two molded parts each defining a face portion, the respective face portions being adhesively secured together, at least some of some openings and slots being formed upon securing the face portions.

15. A structure according to claim 9 wherein said connectors comprise molded plastic blocks which resiliently hold said ends of the joining devices.

* * * * *